March 25, 1952 L. W. DYER ET AL 2,590,522
BUS DUCT PLUG IN ADAPTER
Filed March 9, 1949
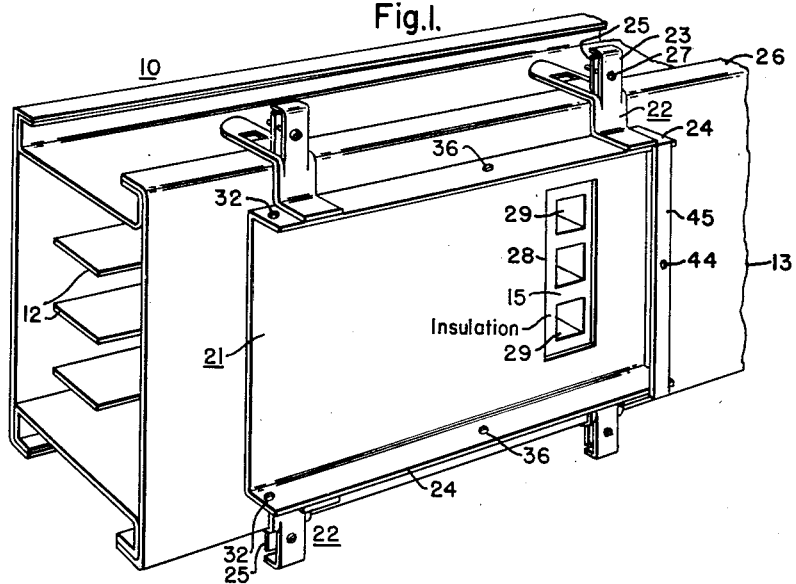
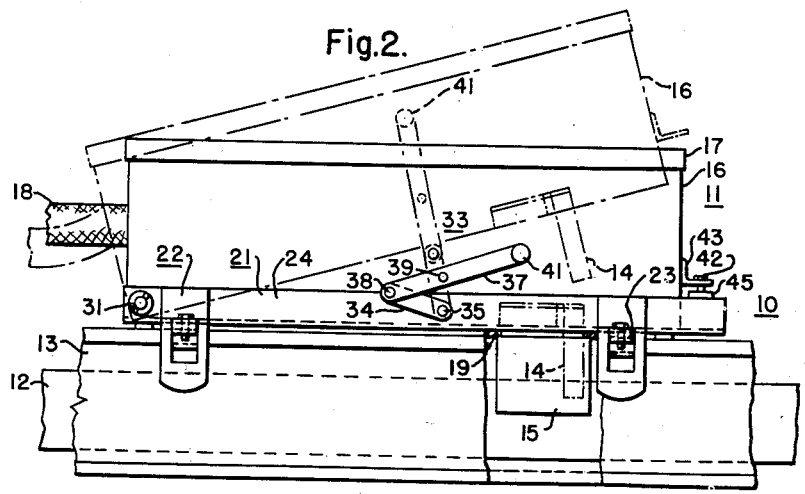
WITNESSES:
INVENTORS
Lloyd W. Dyer and
Gerald J. Freese.
BY
ATTORNEY Patented Mar. 25, 1952

2,590,522

UNITED STATES PATENT OFFICE 2,590,522

BUS DUCT PLUG IN ADAPTER

Lloyd W. Dyer and Gerald J. Freese, Beaver, Pa., assignors to Westinghouse Electric Corporation, East Pittsburgh, Pa., a corporation of Pennsylvania Application March 9, 1949, Serial No. 80,396

5 Claims. (Cl. 175—307)

Our invention relates, generally, to bus duct for electrical distribution systems and, more particularly, to bus duct of the plug-in type in which plug-in or power take-off units are removably attached to the duct housing.

It is the usual practice to provide each plug-in unit with contact members, commonly called stabs, which engage the bus bars inside of the bus duct housing when the plug-in unit is in its operating position on the duct housing. Since the circuit opening device, which is inside of the plug-in unit housing, and the stabs are obscured from view when the plug-in unit is in the operating position, a workman cannot tell, with absolute certainty, when the power take-off circuit is de-energized.

An object of our invention is to provide a visual indication of the electrical condition of a power take-off circuit which is normally energized through a bus duct plug-in unit.

Another object of our invention is to provide for disconnecting the stabs of a bus duct plug-in unit without completely removing the plug-in unit from the bus duct housing.

A more general object of our invention is to provide a plug-in bus duct structure which shall be simple and efficient in operation and which may be economically manufactured and installed.

Other objects of our invention will be explained fully hereinafter or will be apparent to those skilled in the art.

In accordance with one embodiment of our invention, an adapter plate is clamped to the bus duct housing and a conventional plug-in unit is hinged to the adapter plate at the end opposite the connector stabs. Toggle mechanisms are provided for disconnecting the stabs from the bus bars, thereby visually indicating to the operator that the circuit is opened.

For a better understanding of the nature and objects of our invention, reference may be had to the following detailed description, taken in conjunction with the accompanying drawing, in which:

Figure 1 is an enlarged view, in perspective, of a portion of a bus duct with a plug-in adapter plate attached to one side of the duct housing;

Fig. 2 is a view, in side elevation, showing the plug-in unit both in the operating position and in the disconnected position, and Fig. 3 is a view, in end elevation, with the plug-in unit in the operating position.

Referring to the drawing, and particularly to Figs. 2 and 3, the structure shown therein comprises a bus duct 10 and a plug-in unit 11 mounted thereon. The bus duct 10 is of the plug-in type having a plurality of bus bars 12 which are so disposed within a metal housing or duct 13 that they may be engaged by contact members, commonly called stabs, 14, provided on the plug-in unit 11. The bus bars 12 are supported by suitable insulating members 15, one of which is shown in Fig. 1, and which are usually located at regular intervals along the duct.

The plug-in unit 11 comprises a metal housing 16 having a removable or openable cover 17. A switch unit (not shown) is mounted inside the housing 16 and is connected to the contact members 14, thereby connecting the switch unit to the bus bars 12 when the plug-in unit 11 is in the operating position on the duct or housing 13.

It will be understood that power conductors 18, which are connected to the switch unit inside the housing 16, may be connected to power consuming machines. In this manner, the plug-in units 11 may be located at the most advantageous positions along the bus duct for supplying power to the various machines being operated.

Heretofore, it has been the practice to clamp the plug-in unit 11 directly to the duct or housing 13 at the desired location, the stab connectors 14 being inserted through openings provided in the housing 13 to engage the bus bars 12. The switch unit inside the housing 16 was normally utilized for opening the circuit to the power conductors 18. Since the switch unit and the stab connectors 14 were both obscured from view when the plug-in unit was clamped to the housing, it was impossible for a workman to determine with absolute certainty that the circuit to the power conductors was open.

In order to overcome the foregoing difficulty, we have provided for so mounting the plug-in unit 11 on the bus duct housing 13 that the plug-in unit 11 may be actuated to a position in which it can definitely be seen that the stab connectors 14 are disengaged from the bus bars 12.

As shown most clearly in Fig. 1, a channel-shaped adapter plate 21 is clamped to the bus duct housing 13 by clamps 22. The clamps 22 may be of the type disclosed in the copending application of E. O. Krance and G. J. Freese, Serial No. 763,966, filed July 26, 1947, now abandoned. Briefly, each clamp 22 comprises a T-shaped bracket 23, which is secured to a side 24 of the adapter plate 21, and a clamping member 25 which engages a flange 26 of the bus duct housing 13. A screw 27 is provided in the bracket 23 for retaining the clamp 25 in engagement with the flange 26.

As shown in Fig. 1, the insulator 15 is disposed in an opening 19 provided in the side of the bus duct housing 13 and the adapter plate 21 is provided with an opening 28 which is in alignment with the opening in the bus duct housing 13. In the particular structure shown, the insulator 15 is provided with three separate openings 29, one for each phase, through which the stab connectors 14 are inserted to engage the bus bars 12.

As shown in Figs. 2 and 3, the housing 16 of the plug-in unit 11 is hinged to the adapter plate 21 by means of a pin or shaft 31 which is inserted through openings 32 in the sides 24 of the adapter plate 21. It will be understood that other pivotal means may be utilized for mounting the housing 16 on the adapter plate 21. For example, pins provided on the sides of the housing may be inserted in slots provided in the sides 24 of the adapter plate 21, thereby permitting the housing 16 to be lifted from the adapter plate without removing any pins.

The housing 16 may be actuated about the hinge pin 31 in any suitable manner as by means of toggle mechanisms 33 on opposite sides thereof, as shown. Since the hinge pin 31 is disposed at the end of the housing 16 opposite the stab connectors 14, the housing may be raised or tilted to the position shown by the broken lines in Fig. 2, thereby disengaging the stab connectors 14 from the bus bars 12 and providing a visual indication to the operator that the circuit through the stab connectors is open.

As shown, each toggle mechanism 33 comprises a lever 34 which is attached to a side 24 of the adapter plate 21 by means of a pin 35 inserted through an opening 36 in the side 24, and a lever 37 one end of which is connected to the lever 34 by a pin 38. The lever 37 is connected to the side of the housing 16 by a pin 39 and the end of the lever 37 opposite the pin 38 is provided with a handle 41.

As shown in Fig. 2, when the handle 41 is raised to the position shown by the broken lines, the toggle mechanism straightens out to raise the housing 16 to the position shown by the broken lines. Since a toggle mechanism is provided at each side of the housing, both mechanism may be operated simultaneously to raise the housing 16. When the toggles pass dead center they will lock to retain the housing 16 in the raised position. The housing 16 may be retained in the lowered or operating position by a screw 42 which is inserted through a bracket 43 attached to the end of the housing 16 and threaded into an opening 44 provided in a cross member 45 secured to the sides 24 of the adapter plate 21.

From the foregoing description, it is apparent that we have provided for disengaging the stab connectors of a bus duct plug-in unit from the bus bars within the bus duct housing, without completely removing the plug-in unit from the housing. The stab connectors are actuated to such a position that it can be seen that they are disengaged from the bus bars, thereby enabling a workman to determine with absolute certainty that the circuit through the stab connectors is open.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. Means for mounting a plug-in unit housing having an openable cover and stab connectors extending from a side opposite the cover on a bus duct having an opening therein providing access to bus bars within the duct comprising, an adapter plate having an opening therein, clamping means secured to the adapter plate for adjustably attaching said adapter plate to the exterior of the bus duct with said openings in alignment, pivotal means for mounting the plug-in unit housing on the adapter plate with the stab connectors engaging the bus bars within the duct, and toggle mechanisms connected to the plug-in unit housing and the adapter plate for actuating the complete plug-in unit housing about its pivot point to disengage the stab connectors from the bus bars, said toggle mechanisms being operable to a locked position to retain the stab connectors in the disengaged position, said cover being openable without disengaging the connectors from the bus bars.

2. Means for mounting a plug-in unit housing having an openable cover and stab connectors extending from a side opposite the cover on a bus duct having an opening therein providing access to bus bars within the duct comprising, an adapter plate having an opening therein, clamping means secured to the adapter plate for adjustably attaching said adapter plate to the exterior of the bus duct with said openings in alignment, pivotal means at one end of the plug-in unit housing for mounting it on the adapter plate with the stab connectors engaging the bus bars within the duct, and toggle mechanisms connected to opposite sides of the plug-in unit housing and the adapter plate for tilting the complete plug-in unit housing about its pivotal mounting to disengage the stab connectors from the bus bars, said toggle mechanisms being operable to a locked position to retain the stab connectors in the disengaged position, said cover being openable without disconnecting the connectors from the bus bars.

3. Means for mounting a plug-in unit housing having an openable cover and contact members extending from the housing on a bus duct having an opening therein providing access to bus bars within the duct comprising, an adapter plate having an opening therein, clamping means for attaching said adapter plate to the exterior of the bus duct with said openings in alignment, hinge means for mounting the plug-in unit housing on the adapter plate with the contact members extending through said openings to engage the bus bars within the duct, and toggle mechanisms connected to opposite sides of the plug-in unit housing and the adapter plate for actuating the complete plug-in unit housing about its hinge point to disengage the contact members from the bus bars, said toggle mechanisms being operable to a locked position to retain the contact members in the disengaged position, said cover being openable without disengaging the contact members from the bus bars.

4. Means for mounting an enclosed plug-in unit housing having an openable cover and stab connectors extending from the housing on a bus duct having an opening therein providing access to bus bars within the duct comprising, a channel-shaped adapter plate with an opening in the web of the channel, clamping means for attaching said adapter plate to the exterior of the bus duct with said openings in alignment, a shaft mounted in the flanges of the adapter plate near one end thereof for pivotally securing one end of the plug-in unit housing thereto, threaded means for detachably securing the opposite end of the housing to the opposite end of the adapter plate with the stab connectors engaging the bus bars within the duct, and a manually operable mechanism interposed between the adapter plate and the plug-in unit housing for tilting the complete housing about its pivotal supporting shaft to disengage the stab connectors from the bus bars, said mechanism being operable to a locked position to retain the stab connectors in the disengaged position, said cover being openable independently of said mechanism and without disconnecting said connectors.

5. Means for mounting an enclosed plug-in unit housing having an openable cover and stab connectors extending from the housing on a bus duct having an opening therein providing access to bus bars within the duct comprising, a channel-shaped adapter plate with an opening in the web of the channel, clamping means for attaching said adapter plate to the exterior of the bus duct with said openings in alignment, a shaft mounted in the flanges of the adapter plate near one end thereof for pivotally securing one end of the plug-in unit housing thereto, threaded means for detachably securing the opposite end of the housing to the opposite end of the adapter plate with the stab connectors engaging the bus bars within the duct, and a pair of toggle mechanisms connected between the plug-in unit housing on opposite sides thereof and the flanges of the adapter plate for actuating the complete housing about the shaft to a raised position to disengage the stab connectors from the bus bars, said toggle mechanisms being operable to a locked position to retain the housing in its raised position, said cover being openable independently of the toggle mechanisms and without disconnecting said connectors.

LLOYD W. DYER.
GERALD J. FREESE.

REFERENCES CITED

The following references are of record in the file of this patent:

UNITED STATES PATENTS

| Number | Name | Date |
|---|---|---|
| 2,124,269 | Anderson | July 19, 1938 |
| 2,192,587 | Harvey | Mar. 5, 1940 |
| 2,231,056 | De Mask | Feb. 11, 1941 |
| 2,251,403 | Frank et al. | Aug. 5, 1941 |
| 2,281,221 | Anderson | Apr. 28, 1942 |

FOREIGN PATENTS

| Number | Country | Date |
|---|---|---|
| 528,717 | Great Britain | Nov. 5, 1940 |